United States Patent [19]

Schmidt

[11] Patent Number: 5,120,603
[45] Date of Patent: Jun. 9, 1992

[54] MAGNETO-OPTIC RECORDING MEDIUM WITH ORIENTED LANGMUIR-BLODGETT PROTECTIVE LAYER

[75] Inventor: Paul H. Schmidt, West Boylston, Mass.

[73] Assignee: Digital Equipment Corporation, Maynard, Mass.

[21] Appl. No.: 369,713

[22] Filed: Jun. 22, 1989

[51] Int. Cl.⁵ .............................................. B32B 5/16
[52] U.S. Cl. .............................. 428/336; 427/131.1; 427/372.2; 427/430.1; 427/131; 428/64; 428/694; 428/900
[58] Field of Search .................. 428/64, 694, 900, 216, 428/333, 336; 427/131.1, 372.2, 430.1

[56] References Cited

U.S. PATENT DOCUMENTS

| | | | |
|---|---|---|---|
| 4,087,582 | 5/1978 | Shirahata et al. | 428/900 |
| 4,618,561 | 10/1986 | Munakata et al. | 430/156 |
| 4,690,857 | 9/1987 | Shirahata et al. | 428/900 |
| 4,693,915 | 9/1987 | Matsuda et al. | 428/411.1 |
| 4,696,838 | 9/1987 | Miyata et al. | 427/407.2 |
| 4,766,047 | 8/1988 | Matsuda et al. | 430/19 |
| 4,844,991 | 7/1989 | Miura et al. | 428/900 |
| 4,845,240 | 7/1989 | Hibino et al. | 428/64 |
| 4,913,948 | 4/1990 | Ando et al. | 428/64 |
| 4,923,519 | 5/1990 | Rodi et al. | 428/403 |
| 4,933,221 | 6/1990 | Nishimura et al. | 428/64 |

FOREIGN PATENT DOCUMENTS

| | | |
|---|---|---|
| 0230024 | 7/1987 | European Pat. Off. |
| 261049 | 12/1985 | Japan |
| 61-048124 | 3/1986 | Japan |
| 113924 | 5/1988 | Japan |

OTHER PUBLICATIONS

Roberts, "Molecular Electronics Using Langmuir-Blodgett Films", Chap. 4 *Electronic and Photonic Applications of Polymers*, American Chemical Society, Washington (1988).

*Primary Examiner*—Paul J. Thibodeau
*Assistant Examiner*—Robert J. Follett
*Attorney, Agent, or Firm*—Fish & Richardson

[57] ABSTRACT

A low-frictiona, corrosion-resistant substrate includes a substrate and a macromolecular Langmuir-Blodgett film in coating relationship with the substrate, the film having a multiplicity of macromolecules, each including a hydrophobic end and a hydrophilic end, wherein the hydrophilic end of substantially each macromolecule is bonded to a surface of the substrate and the hydrophobic end of each macromolecule resides at the interface of the film coating and the surrounding air. The film may also include planar heterocyclic molecules. A low-friction corrosion-resistant read/write head and/or recording medium includes Langmuir-Blodgett film in coating relationship with the surface thereof.

15 Claims, 2 Drawing Sheets

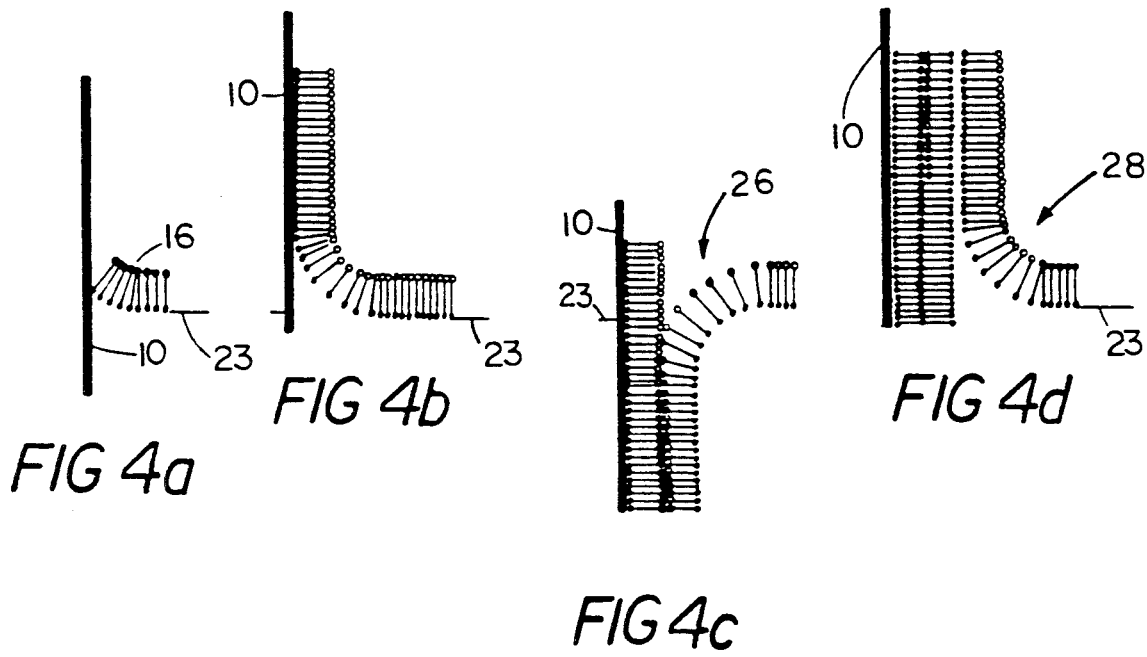
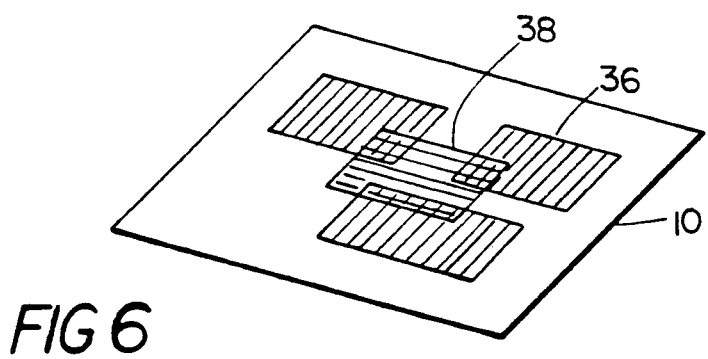
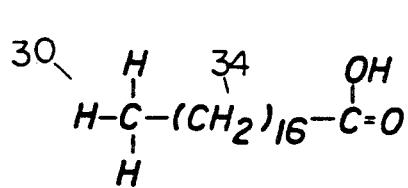
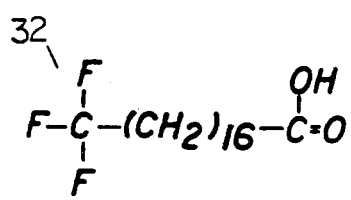

MAGNETO-OPTIC RECORDING MEDIUM WITH ORIENTED LANGMUIR-BLODGETT PROTECTIVE LAYER

BACKGROUND OF THE INVENTION

This invention relates to surface coatings for reducing friction between contacting surfaces and for protecting surfaces from corrosion.

Previously, recording media such as oxide disks were coated with a 30–120Å layer of fluorinated oil to reduce friction while the head is in contact with the disk, and to protect the disk from corrosive atmospheric contaminants. This coating has worked well for systems achieving densities of around less than or about equal to 60–100 mB per square inch, wherein the read/write heads fly relatively high over the recording medium, but will no longer be usable with the lower flying heights currently under development.

SUMMARY OF THE INVENTION

A low-friction, corrosion-resistant film is provided, and a method for making same. In one aspect of the invention, a low-friction corrosion-resistant coated substrate includes a substrate and a macromolecular Langmuir-Blodgett (L.B.) film in coating relationship with the substrate, each macromolecule having a hydrophobic end group and a hydrophilic end group, wherein the hydrophilic end of each macromolecule is bonded to a surface of the substrate or an adhesion layer, and the hydrophobic end of each macromolecule resides at the interface of the film coating and the surrounding air. The substrate may be a magnetic disk or a thermo-magneto optical disk. The L.B. film coating may be less than or equal to about 30Å or 75Å. Preferably the macromolecules are cross-linked and/or polymerized and the film coating has a plurality of monolayers substantially of fatty acid molecules. The fatty acid molecules can be stearic acid molecules. The L.B. film coating can include a plurality of monolayers with anti-friction properties essentially the same as a monolayer of polytetrafluoroethylene; each of the monolayers may include stearic acid molecules, each with its methyl group replaced by a $CF_x$ group, wherein x may take the value 1, 2, or 3.

In another aspect of the invention, a low-friction, corrosion resistant coated substrate includes a substrate and a coating film including planar heterocyclic molecules. The molecules may be planar metal phthalocyanines.

In another aspect of the invention, a method for making a low-friction corrosion-resistant coated substrate includes applying a Langmuir-Blodgett (L.B.) film coating to the surface of a substrate, wherein the L.B. film coating includes macromolecules, each comprising a hydrophobic end and a hydrophilic end, wherein the hydrophilic end of each macromolecule is bonded to a surface of the substrate or to an adhesion layer and the hydrophobic end of each macromolecule resides at the interface of the film coating and the surrounding air. The L.B. film coating can be less than or equal to about 30Å or 75Å. Another step can include subsequently cross-linking the macromolecules to improve the thermal and/or wear properties of the L.B. film. The L.B. film coating can include a plurality of monolayers with anti-friction properties essentially the same as those of a monolayer essentially of polytetrafluorethylene. Each of the monolayers can be a monolayer which includes molecules whose terminal methyl group is replaced by a $CF_x$ group, wherein x may take the value 1, 2, or 3. The film coating can be a plurality of monolayers including fatty acid molecules. The fatty acid molecules can be stearic acid molecules or polyacetylenes.

In another aspect of the invention, a method for making a low-friction corrosion-resistant coating on a substrate including applying a film including planar or nearly planar heterocyclic molecules to the surface of a substrate. The molecules can be planar metal phthalocyanines.

In another aspect of the invention, a method for the reduction of friction between a read/write head and the surface of a rotating disk recording medium includes the application of a Langmuir-Blodgett (L.B.) film coating to the surface of a recording substrate, wherein the L.B. film coating includes macromolecules, each including a hydrophobic end and a hydrophilic end wherein the hydrophilic end of each macromolecule is bonded to a surface of the recording substrate or to an adhesion layer of uniform or nearly uniform energy upon the substrate, and the hydrophobic end of each macromolecule resides at the interface of the film coating and the surrounding air. The L.B. film coating can be less than or equal to about 30Å or 75Å. Another step can include subsequently cross-linking the macromolecules. The film coating can include a plurality of monolayers essentially of fatty acid molecules. The fatty acid molecules can be stearic acid molecules. The L.B. film coating can have a plurality of monolayers with anti friction properties substantially the same as those of monolayer essentially of polytetrafluroethylene. Each of the monolayers can be a monolayer including stearic acid molecules whose terminal methyl group is replaced by a $CF_x$ group, wherein x may take the value 1, 2, or 3.

In another aspect of the invention, a method for the reduction of friction induced between a read/write head and the surface of a rotating disk recording medium includes the application of a film including planar heterocyclic molecules.

In another aspect of the invention, a method for the exclusion of moisture from the surface of a disk recording medium includes the application of a L.B. film coating of a multiplicity of macromolecules, each having hydrophobic end and a hydrophilic end, wherein the hydrophilic end of each macromolecule is bonded to surface of a recording substrate and the hydrophobic end of each macromolecule resides at the interface of the film coating and the surrounding air. The hydrophobic end-group can be an aromatic group. The hydrophobic end-group can be a $CF_x$ group, wherein x may take the value 1, 2, or 3.

In another aspect of the invention, a low-friction corrosion-resistant read/write head includes a read/write head; and a macromolecular Langmuir-Blodgett (L.B.) film in coating relationship with the read/write head, the film including a multiplicity of macromolecules, each having a hydrophobic end and a hydrophilic end, wherein the hydrophilic end of each macromolecule is bonded to a surface of the read/write head and the hydrophobic end of each macromolecule resides at the interface of the film coating and the surrounding air. The L.B. film coating can be less than or equal to about 30Å or 75Å, the film coating at least being over a portion of the head air bearing surface. The macromolecules can be cross-linked in a post-polymerization step to improve the thermal stabilization of the L.B. film The film coating can include a plurality of monolayers which includes fatty acid molecules or polyacetylene molecules. The fatty acid molecules can be stearic acid molecules. The L.B. film coating can include a plurality of monolayers with anti-friction properties essentially the same as a monolayer essentially of polytetrafluoroethylene. The monolayers can include stearic acid molecules, each with its methyl group replaced by a $CF_x$ group, wherein x may take the value 1, 2, or 3.

In another aspect of the invention, a low-friction, corrosion-resistant, read/write head including a read/write head and a coating of a film having planar heterocyclic molecules. The molecules can be planar metal phthalocyanines.

In another aspect of the invention, a method for making a low-friction corrosion-resistant read/write head includes applying a Langmuir-Blodgett (L.B.) film coating to the surface of a read/write head, wherein the L.B. film coating has macromolecules, each having a hydrophobic end and a hydrophilic end, wherein the hydrophilic end of each macromolecule is bonded to a surface of the read/write head and the hydrophobic end of each macromolecule resides at the interface of the film coating and the surrounding air. The L.B. film coating is not thicker than 30Å, or 75Å. A further step may include subsequently cross-linking the macromolecules to improve the thermal stability properties of the L.B. film. The L.B. film coating may include a plurality of monolayers with anti-friction properties essentially the same as those of a monolayer essentially of polytetrafluoroethylene. Each of the monolayers can be a monolayer including molecules whose terminal methyl group is replaced by a $CF_x$, group wherein x may take the value 1, 2, or 3. The film coating can include a plurality of monolayers which includes fatty acid molecules. The fatty acid molecules can be stearic acid molecules or polyacetylenes.

In another aspect of the invention, a method for making a low-friction read/write head includes applying a film including planar heterocyclic molecules to the surface of a read/write head. The molecules can be planar metal phthalocyanines. The molecules can be planar metal phthalocyanines used in conjunction with a perfluorinated polyether. The molecules can be planar metal phthalocyanines used in conjunction with a perfluorinated polyether.

The invention allows lower read/write head flying heights, while also reducing the coefficient of friction, and/or providing a barrier to moisture, and resistant to corrosion due to atmospheric contamination.

Use of these L.B. films may be in conjunction with use of liquid lubricants for lubrication of the head/disk interface.

FIG. 4a, 4b, 4c and 4d are schematic representations of the immersion of a hydrophilic recording substrate, withdrawal of the substrate, reimmersion, of the substrate and a second withdrawal of the substrate, respectively.

FIG. 5a and 5b are structural formulae of stearic acid, and stearic acid with its terminal methyl ($CH_3$) group replaced by a ($CF_3$) group, respectively.

FIG. 6 is a top perspective view of a portion of the surface of a disk recording substrate coated with planar metal phthalocyanine molecules.

DESCRIPTION OF THE PREFERRED EMBODIMENT

Structure

Figure 1:
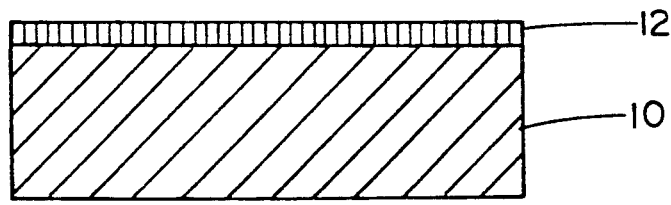
FIG. 1 is a schematic representation of a cross sectional side view of a coated disk recording medium.
Figure 2:
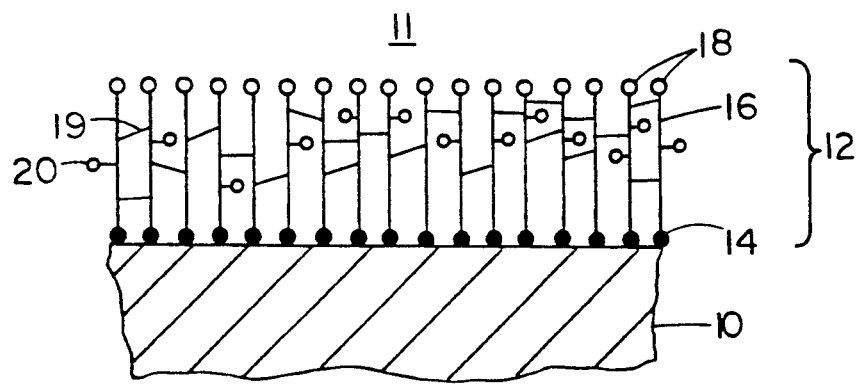
FIG. 2 is a schematic representation of a molecular monolayer, wherein the macromolecules are in a semi-crystalline state.

Referring to FIGS. 1 and 2, Langmuir-Blodgett (L.B.) films 12 of the present invention include one or more molecular monolayers, each of which has macromolecules 16 oriented perpendicular or highly inclined to the plane of the monolayers. One end of each molecule 16 is hydrophobic 18, and the other end is hydrophilic 14. FIG. 2 shows that the hydrophobic ends 18 form an interface with the air 11, serving to repel moisture, while the hydrophilic ends 14 are bonded to the hydrophilic substrate 10.

L.B. films are made one or nearly one layer at a time. The organic molecules 16 which comprise each monolayer 12 have a unique and precisely known molecular length. Thus, by depositing a known number of layers, the thickness of the film can be controlled to within a few angstroms. Molecular engineering of the molecular end groups 18 can enhance the frictional lubrication and wear properties of the coating. Aromatic end groups 18, for example, would enhance the hydrophobic, or water repelling properties of the coating. The addition of aromatic side groups 20 may be used to increase the thermal stability of the coating.

Manufacture

Figure 3A:
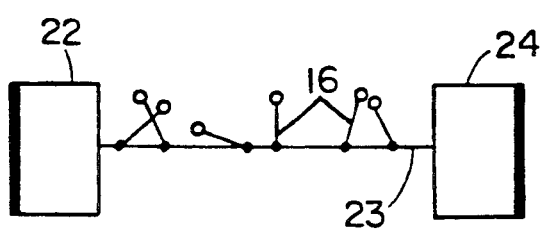
FIG. 3a is a schematic representation of macromolecules with their hydrophilic ends aligned in an aqueous solvent.
Figure 3B:
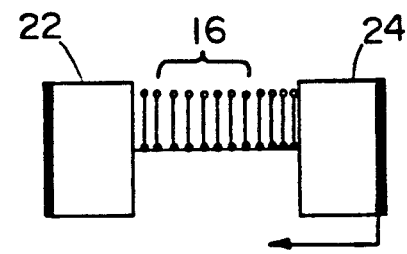
FIG. 3b is a schematic representation of macromolecules aligned after compression by a moveable piston.

The Langmuir-Blodgett coating technique is well-known in the art. Referring to FIG. 3a, a solvent container is used which has a fixed end 22, and an opposing movable piston 24. Coating material, such as stearic acid, is dissolved in the solvent 23, which is chosen on the basis of the desired orientation of the hydrophobic/hydrophilic ends with respect to the surface to be coated. Minimum energy requirements automatically force the molecules 16 into a monolayer. Referring to FIG. 3b, using the movable piston 24, pressure is exerted along the surface of the solvent 23 so as to force the molecules 16 together. Intermolecular van der Waals attractions cause the monolayer to become semi-crystalline. The monolayer will remain semi-crystalline as long as the pressure is maintained.

Referring to FIGS. 4a and 4b, the substrate 10 to be coated is then dipped into the solution 23. The monolayer may be allowed to remain in the semi-crystalline state after being applied to the surface to be coated with one end of each of the molecules affixed to the surface. However, the film may be further engineered through exposure to bond breaking ionizing radiation for modification of film properties. This will result in a material which is darker (i.e., more reflective), harder, and more resistant to thermal destruction, such as would be desirable in high contact uses.

Referring to FIGS. 4c and 4d, continuing the process, the substrate 10 is again dipped into the solution 23, while maintaining pressure with the piston 22 to deposit a second layer 26. Pulling the substrate 10 out of the solution 23 will deposit a third layer 28. Pre-treating the surface of the article to be coated 10 determines whether the hydrophobic 18 or hydrophilic 14 end of the molecules will reside at the air interface 11.

When coating disks, the film is preferably less than or equal to 75Å thick, with the hydrophobic ends of the molecules residing at the air interface 11. Referring to FIG. 5a, a suitable molecule for this application is stearic acid $CH_3(CH_2)_{16}COOH$. The hydrophobic end ($CH_3$) resides at the air interface 11 so that moisture is excluded from the coated surface 10. Modification of the stearic acid molecule, such as the example shown in FIG. 5b, includes where the methyl ($CH_3$) group 30 is replaced by a ($CF_3$) group 32. Collectively, the ($CF_3$) groups form a surface with properties similar to a monolayer of polytetrafluoroethylene. The ($CF_3$) groups may be replaced with $CF$ or $CF_2$ groups yielding similar results.

Referring again to FIG. 2, replacing the hydrophobic ($CH_3$) group 18 with an aromatic group will produce a surface with still different properties, such as a more thermally stable surface. Also, the aromatic groups 20 may be affixed along the main carbon chain 34 so as to increase the thermal stability. This is advantageous when contacting heads and disks at high rotational speeds.

To improve the thermal resistance of the film 12, it is polymerized after being applied to the substrate 10. By irradiating the L.B. layers with short wavelength radiation (less than or about equal to 6000Å), the molecules are encouraged to form intermolecular cross-links 19 such as shown in FIG. 2.

Referring to FIG. 6, planar heterocyclic molecules, such as the planar metal phthalocyanines, may also function as a corrosion-resistant, moisture-repellant and friction-reducing coating. Phthalocyanines are soluble in known solvents, and therefore can be deposited by a method similar to the L.B. technique, simply by dipping the substrate 10 in a solution of planar metal phthalocyanine molecules. Films of planar heterocyclics differ from the L.B. films in the way they protect the surface of the medium in that the constituent molecules are oriented coplanar among themselves and nearly coplanar with the surface of the substrate 10, multiple layers thus forming a graphite-like assembly. These layers are capable of slipping with respect to each other, similar to the sliding behavior of the stacking planes of graphite.

Contact with a head, for example, would cause the top planes 38 to slip relative to the planes at the surface of the object 36. The bonding between these planes is weak, and therefore the coefficient of friction is low.

It will now be understood that a low-friction corrosion-resistant film, in practice of the present invention, may be applied to various surfaces, such as moving, flying or sliding in a recording system, with improved, frictional, thermal and/or wear properties. The film may be applied in various thicknesses, having a multiplicity of molecules, in the manner taught herein.

Other modifications and variations will occur to those skilled in the art that are nevertheless within the spirit and scope of the invention.

I claim:

1. A low-friction, corrosion-resistant, coated optical recording medium comprising:
   (a) a thermo-magneto optical recording medium; having
   (b) a macromolecular Langmuir-Blodgett (L.B.) film in coating relationship with the thermo-magneto optical recording medium, the film is comprised of macromolecules, each having a hydrophobic end group and a hydrophilic and group, wherein the hydrophilic end of each macromolecule is bonded to a hydrophilic surface of said thermo-magneto optical medium, and the hydrophobic end of each macromolecule resides at the interface of the film coating and the surrounding air.

2. The substrate of claim 1 wherein the L.B. film coating is less than or equal to about 75Å.

3. The substrate of claim 1 wherein the macromolecules are cross-linked and/or polymerized.

4. The substrate of claim 1 wherein the film coating comprises a plurality of monolayers substantially of fatty acid molecules.

5. The substrate of claim 4 wherein the fatty acid molecules are stearic acid molecules.

6. A method for making a low-friction, corrosion resistant, coated optical recording medium comprising the step of:
   applying a Langmuir-Blodgett (L.B.) film coating to the surface of a thermo-magneto optical recording medium, wherein the L.B. film coating includes macromolecules, each comprising a hydrophobic end and a hydrophilic end, wherein the hydrophilic end of each macromolecule is bonded to a hydrophilic surface of said thermo-magneto optical recording medium and the hydrophobic end of each macromolecule resides at the interface of the film coating and the surrounding air.

7. The method of claim 6 wherein the L.B. film coating is less than or equal to about 75Å.

8. The method of claim 6 further comprising the step of subsequently cross-linking the macromolecules to improve the thermal and/or wear properties of the L.B film.

9. The method of claim 6 wherein the film coating comprises a plurality of monolayers including fatty acid molecules.

10. The method of claim 9 wherein the fatty acid molecules are stearic acid molecules or polyacetylenes 11. A method for the reduction of friction between read/write component operated in close proximity or contact with the surface of a rotating disk optical recording medium comprising:
   applying a Langmuir-Blodgett (L.B.) film coating to the surface of a thermo-magneto optical recording medium, wherein the L.B. film coating include macromolecules, each including a hydrophobic end and a hydrophilic end, wherein the hydrophilic end of each macromolecule is bonded to a hydrophilic surface of said thermo-magneto optical recording medium, and the hydrophobic end of each macromolecule resides at the interface of the film coating and the surrounding air.

12. A method of claim 11 wherein the L.B. film coating is less than or equal to about 75Å.

13. The method of claim 11 further comprising the step of subsequently cross-linking the macromolecules 14. The method of claim 11 wherein the film coating comprises a plurality of monolayers essentially of fatty acid molecules.

15. The method of claim 14 wherein the fatty acid molecules are stearic acid molecules.

* * * * *

UNITED STATES PATENT AND TRADEMARK OFFICE
CERTIFICATE OF CORRECTION

PATENT NO. : 5,120,603
DATED : June 9, 1992
INVENTOR(S) : Paul H. Schmidt

It is certified that error appears in the above-indentified patent and that said Letters Patent is hereby corrected as shown below:

Item [57]

<u>Abstract</u>

Line 1, "low-frictiona" should read --low-friction--.

Column 3, after line 53, insert --BRIEF DESCRIPTION OF THE DRAWINGS--.

<u>Claims</u>

Column 6, line 3, claim 1, "and" (second occurrence) should read --end--.

Signed and Sealed this

Fifth Day of October, 1993

Attest:

BRUCE LEHMAN

*Attesting Officer*  Commissioner of Patents and Trademarks